United States Patent [19]

Nakata

[11] Patent Number: 5,049,177
[45] Date of Patent: Sep. 17, 1991

[54] METHOD FOR FORMING FRESNEL-TYPE PRISM LENS

[75] Inventor: Yutaka Nakata, Isehara, Japan

[73] Assignee: Ichikoh Industries, Ltd., Tokyo, Japan

[21] Appl. No.: 452,508

[22] Filed: Dec. 19, 1989

Related U.S. Application Data

[62] Division of Ser. No. 283,719, Dec. 13, 1988, Pat. No. 4,904,069.

[30] Foreign Application Priority Data

Dec. 14, 1987 [JP] Japan ................................ 62-314290
Dec. 16, 1987 [JP] Japan ................................ 62-316051

[51] Int. Cl.$^5$ ............................................. C03B 11/06
[52] U.S. Cl. ............................................. 65/93; 65/95; 65/99.1; 65/105
[58] Field of Search ................... 65/64, 93, 95, 99.1, 65/102, 105; 350/452

[56] References Cited

U.S. PATENT DOCUMENTS

| | | |
|---|---|---|
| 1,898,251 | 2/1933 | Kopp . |
| 2,086,356 | 7/1937 | Falge et al. ............................ 65/102 |
| 2,272,119 | 2/1942 | Jaeckel ............................ 350/452 X |
| 2,610,444 | 9/1952 | Kurz ............................ 65/93 X |
| 4,361,429 | 11/1982 | Anderson et al. ............................ 65/93 X |
| 4,787,722 | 11/1988 | Claytor ............................ 350/452 |

FOREIGN PATENT DOCUMENTS 2294990 7/1976 France .

Primary Examiner—Robert L. Lindsay
Attorney, Agent, or Firm—Foley & Lardner

[57] ABSTRACT

The method for forming Fresnel lens according to the present invention is such that a Fresnel lens comprising a body with a frontal surface having a plurality of annular Fresnel-type prism elements concentrically disposed thereon and a back surface formed substantially flat is formed from a molten sheet glass. The method comprises a step of preparing cavities of which the shapes are derived from inversion of the shapes of the plurality of annular Fresnel-type prism elements, a step of disposing the molten sheet glass on a stationary mold having a substantially flat surface, a step of pressing the molten sheet glass with a moving mold having the cavities to make a portion of the molten glass flow into said cavities, and a step of solidifying the molten glass and removing the moving mold thereafter. The shapes of said cavities are previously designed so that portions of the molten glass corresponding to the Fresnel-type prism elements flow substantially only within small area corresponding to the corresponding Fresnel-type prism elements while the sheet glass is being pressed. This method permits to minimize surface defects such as wrinkle caused during forming, reduce the time required for forming, and to form a Fresnel lens having excellent optical properties.

3 Claims, 6 Drawing Sheets

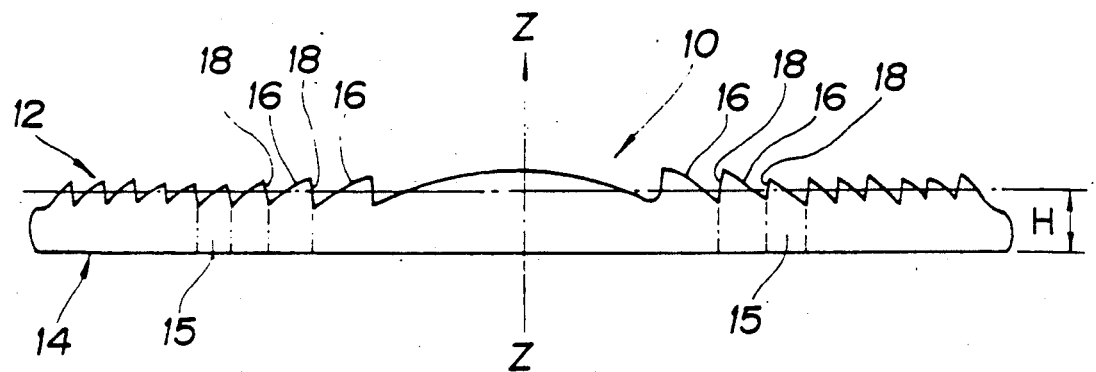
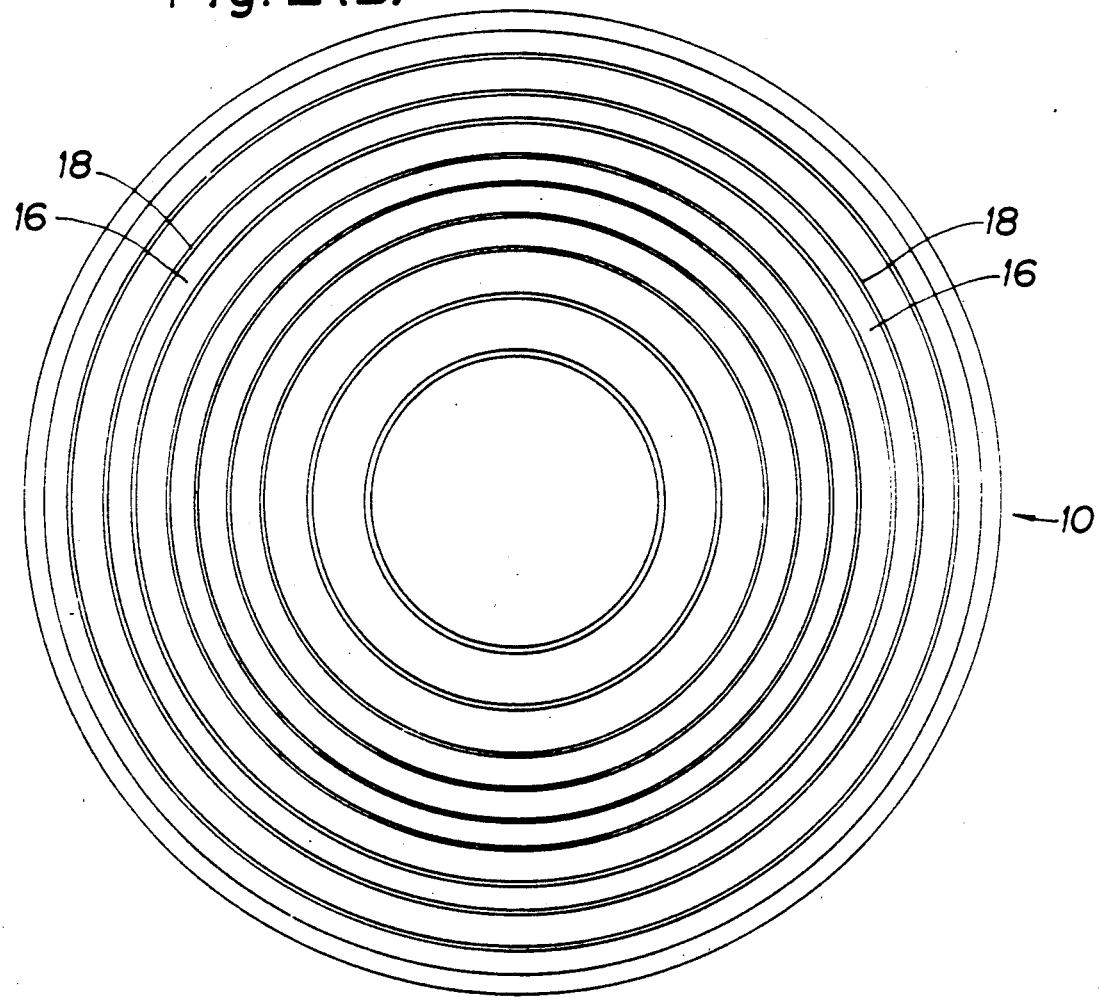

METHOD FOR FORMING FRESNEL-TYPE PRISM LENS

This application is a division, of application Ser. No. 07/283,719, filed Dec. 13, 1988 now U.S. Pat. No. 4,904,069, granted Feb. 27, 1990.

BACKGROUND OF THE INVENTION a) Field of the Invention

The present invention relates to a method for forming a Fresnel lens destined for use as condensing lens in an automotive lighting, etc. and a Fresnel lens formed by the same method, and more particularly to a method for forming a Fresnel lens having excellent optical properties easily and with a high precision and which can minimize the defect on the lens surface caused by a flow of the glass material in the process of pressing.

b) Description of the Prior Art

Fresnel-type prism lens is generally formed from a synthetic resin or glass. In case a Fresnel-type prism lens is formed from a synthetic resin by injection molding, the process is relatively easy and the resulted lens has a smooth surface. However, the forming of such lens from a glass by pressing is disadvantageous in that the flow of a molten glass near the glass material in the process of pressing results in a surface defect which deteriorates the surface smoothness and optical properties of the lens and also that the difference in temperature distribution of the molten glass between near the surface and the inside thereof becomes considerably larger as the time passes. So it is desired to reduce the forming time and improve the yield so that the forming is completed at a temperature near the glass transition point or transformation temperature.

FIGS. 1 (A) to (C) show a conventional method, namely, a gob pressing method, for forming a Fresnel-type prism lens from a molten glass by pressing. As shown in FIG. 1 (A), a glass material 1 is put on a stationary mold 2 having a nearly flat surface. A female mold 3 having an irregularity of a configuration derived from inversion of the configuration of each element of a prism to be formed is installed on a press (not shown in the drawing). As shown in FIG. 1 (B), the female mold 3 is moved down in the direction of arrow X toward the glass material 1 on the stationary mold 2. The glass material 1 is pressed by the female mold 3 into a partially fabricated item 4. This partially fabricated item 4 is further pressed and finally formed into a Fresnel-type prism lens 8 having prism elements 6 of predetermined shapes as shown in FIG. 1 (C).

In the process of pressing in which a gob-like glass material 1 is pressed into a partially fabricated item 4 (shown in FIG. 1 (B), as the gob-like glass material 1 is pressed outwardly at a temperature near the yield point at which a material reaches its maximum coefficient of expansion, shows a relatively low plasticity and starts shrinking, so that the molten glass especially near the surface of the gob-like glass material 1 flows in the direction of arrow a along the convex and concave surfaces forming the female mold 3, that is, the molten glass flows from a concave surface toward an outer concave surface beyond a convex surface between these concave surfaces. In the process shown in FIG. 1 (C), other molten glass than near the surface of the gob-like glass material 1 is also subject to outward pressing. Thus, the surface of the prism lens 8 finally formed incurs surface defects like wrinkle, etc. as the case may be. The prism lens 8 thus formed has a poor surface smoothness and also poor optical properties.

To overcome the above-mentioned drawbacks of the conventional method of gob pressing, methods for forming a glass article from a molten sheet glass have been proposed (one example is disclosed in the U.S. Pat. No. 4,361,429), which, however, cannot provide any surface configuration of a high precision such as a Fresnel-type prism lens having a plurality of aspherical surfaces for predetermined optical properties.

Generally, the aspherical geometric shape forming each of the above-mentioned prism elements is given as a special solution of a certain partial differential equation. However, it does not suffice for a practical aspherical geometric shape to provide such special solution but the shape is determined taking in consideration of the relation among the other design requirements including the thickness of a substrate on which the aspherical surface of each prism element is formed (substrate thickness), maximum thickness including the aspherical surface of each prism element and maximum distance between prism elements (pitch). The geometrical shapes thus determined of aspherical surfaces forming the prism elements are all different from one another and the pitch is not constant. Therefore, the volumes of the prism elements are all different from one another as well. Hence, the above-mentioned problem that the surface defects are caused by the flow of the molten glass near the surface of the glass material from a cavity corresponding to each prism element into a cavity corresponding to an adjacent prism element still remains unsolved.

SUMMARY OF THE INVENTION

The present invention has an object to provide a method for forming a Fresnel-type prism lens from a molten sheet glass easily and with a high precision.

It is another object of the present invention to provide a method for forming a Fresnel-type prism lens by which the flow of the molten glass portion near the surface of a glass material is substantially done only with in a small region corresponding to each prism element and a Fresnel-type prism lens of excellent optical properties can be formed with a minimum surface defects such as wrinkle and the like and in a reduced time for forming.

It is a still another object of the present invention to provided a Fresnel-type prism lens formed from a molten sheet glass and having excellent optical properties, and more particularly a thin and lightweight Fresnel-type prism lens suitably usable as projector lens in an automotive head light assembly of projector type.

These and other objects and advantages of the present invention will be better understood from the ensuing description made, by way of example, of the embodiment of the present invention with reference to the drawings.

BRIEF DESCRIPTION OF THE DRAWINGS

FIG. 2 (A) is a schematic drawing for explanation of the Fresnel-type prism lens formed by the method according to the present invention;

FIG. 2 (B) is a plan view of the Fresnel-type prism lens formed by the method according to the present invention;

DETAILED DESCRIPTION OF THE PREFERRED EMBODIMENT

Figure 1A:
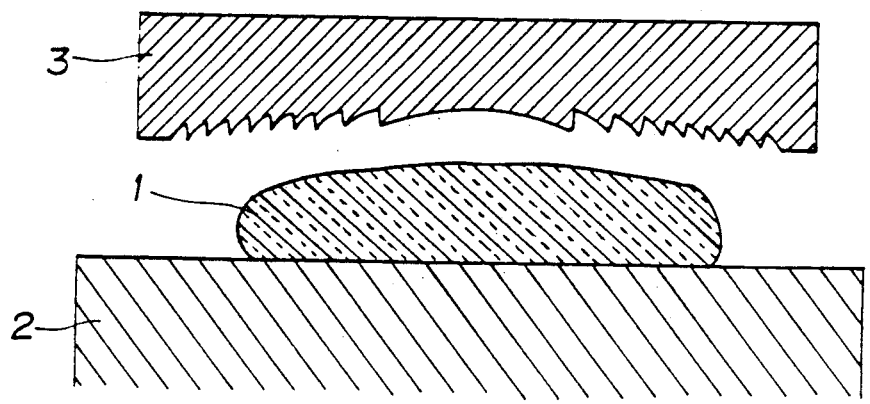
FIGS. 1 (A) to (C) are schematic drawings of the manufacturing processes for explanation of the conventional method for forming Fresnel-type prism lens by gob pressing.
Figure 1B:
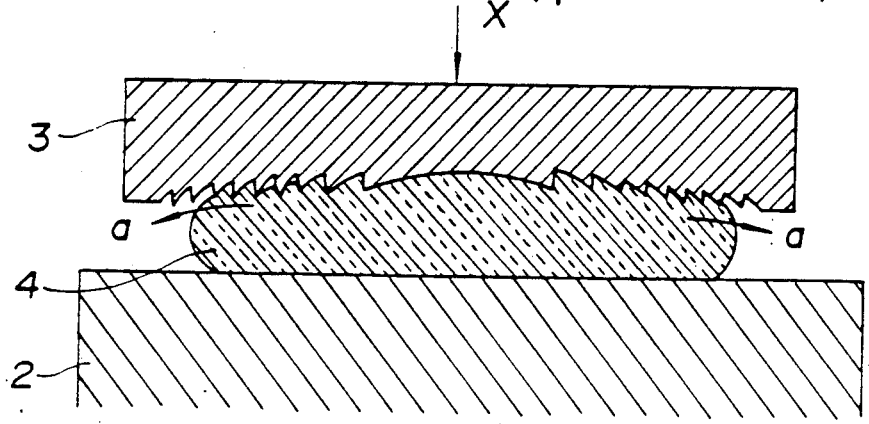
Figure 1C:
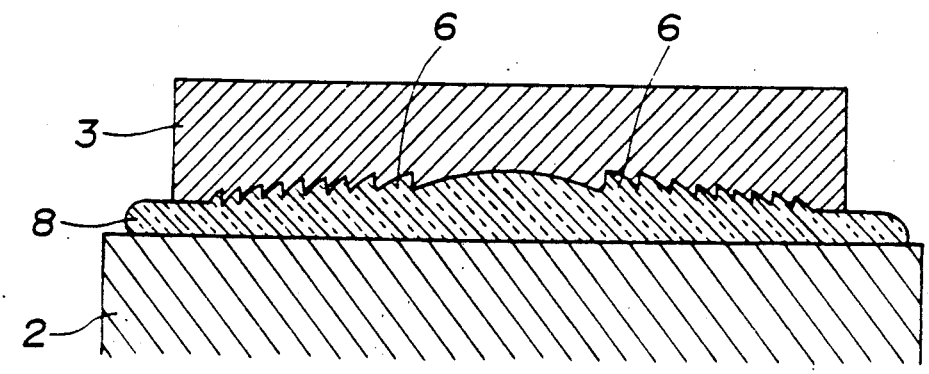

FIG. 2 schematically shows a Fresnel lens 10 formed by the method according to the present invention. The Fresnel lens 10 comprises a disk-shaped lens body having a front surface 12 and back surface 14. The frontal surface 12 is formed by a plurality of concentrical Fresnel prism elements 15 while the back surface 14 is substantially flat. Each of the Fresnel prism elements 15 is radial from a focus (not shown) on an optical axis Z—Z and has a aspherical portion 16 which refracts an incident light in a direction substantially parallel to the optical axis Z—Z and a riser 18 which is not substantially contributed to the optical properties of the Fresnel lens 10. The Fresnel lens 10 composed of such Fresnel prism elements 15 is formed by pressing a molten sheet glass by a female mold with cavities having inverted shapes of the Fresnel prism elements 15. The female mold cavities for defining the plural Fresnel prism elements 15 forming together such Fresnel lens 10 are previously designed so that the molten glass portion near the surface of the molten sheet glass can evenly flow into the cavities to all the corners thereof in the process of pressing. That is, the female mold is so configured that the molten glass near the surface of the molten sheet glass will not flow from a cavity corresponding to a prism element into a cavity corresponding to an adjacent prism element as in the conventional methods for forming Fresnel lens.

Figure 3A:
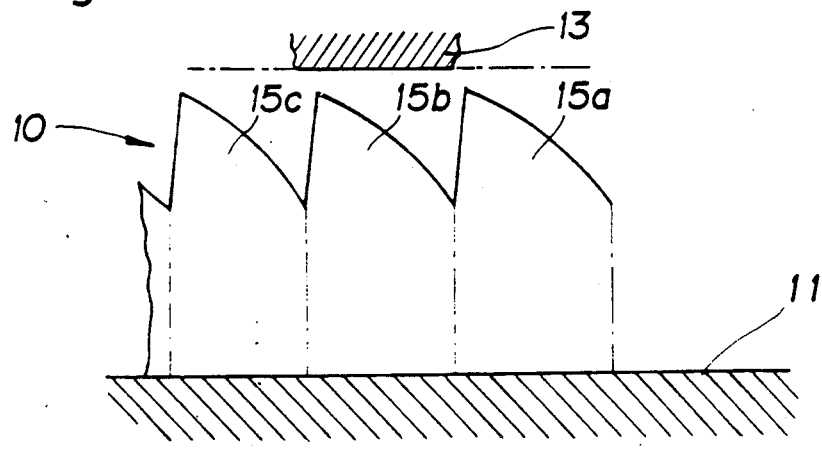
FIGS. 3 (A) to (C) are explanatory drawings of the principle of the method according to the present invention.
Figure 3B:
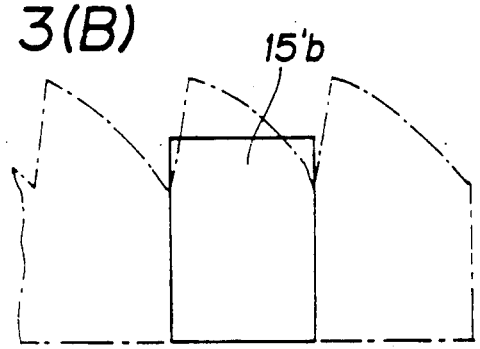
Figure 3C:
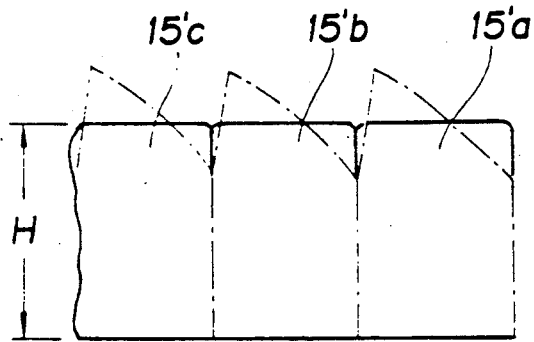

The method for forming Fresnel lens according to the present invention will be described herebelow. First the thinking experiment which is the basis for materializing the method for forming Fresnel lens from molten sheet glass according to the present invention will be described with reference to FIGS. 3 (A) to (C). Three of the plural prism elements 15 are indicated with reference numerals 15a, 15b and 15c, respectively. The prism elements 15a, 15b and 15c may be considered as hollow cylinders each having a prism portion at the top thereof and different in radius from one another, which are concentrically disposed as closely adjoined each other. It is assumed that these elements are formed from a plastic material, for example, a molten sheet glass kept at a temperature higher than the glass transition point and rather lower than the yield point and placed on a flat surface 11. Also, it is assumed concerning one of the prism elements 15, for example, the prism element 15b, that a hollow cylindrical press head 13 having a lower end face nearly parallel to the surface 11 is moved down toward the end of the prism element 15b to press the latter, whereby the prism element 15b is plastically deformed into a hollow cylinder 15'b which is somewhat higher than before the prism element 15b is pressed but of which the radius remains unchanged, as shown in FIG. 3 (B). In this case, it is also assumed that only the upper portion of the prism element 15b is deformed and that the horizontal deformation is ignorable. Similarly, the other adjoining prism elements 15a and 15c are deformed into hollow cylinders 15'a and 15'c, respectively, of which the height is a little larger than before pressed but the radius remains unchanged. In this case, if all the height of the hollow cylinders 15'a, 15'b and 15'c resulted from the deformation are equal to H as shown in FIG. 3 (C), it means that the plastic flow of the molten glass substantially occurs only within each prism element, not between the adjoining prism elements.

Figure 4:
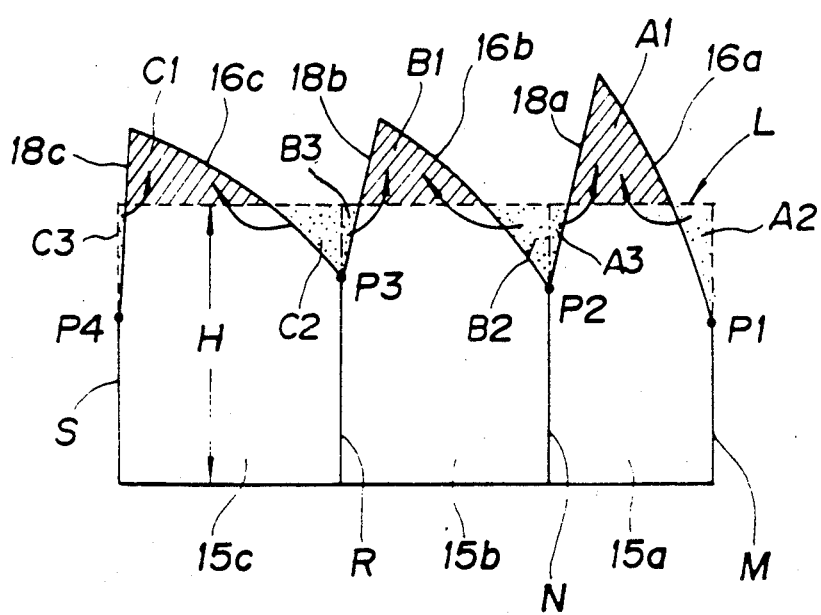
FIG. 4 is an explanatory drawing illustrating the flow of a molten glass portion corresponding to each prism element of the Fresnel-type prism lens formed by the method according to the present invention.

The method for forming Fresnel lens according to the present invention is a reverse application of the above-mentioned processes to the plastic working process. According to the present invention, the processes shown in FIGS. 3 (A) to (C) are reversely effected to form a Fresnel lens without any flow of the molten glass between adjoining prism elements while the molten glass flows only within a small region corresponding to each prism element. To avoid the flow of the molten glass between the adjoining prism elements, a special relation in shape must be set between the prism elements 15. In other words, it is necessary to provide a female mold having cavities of which the shapes are obtained by inverting the specific shapes of the prism elements 15. An approach for defining the shapes of the prism elements of the Fresnel-type prism lens will be qualitatively discussed with reference to FIG. 4. First, the thickness H of a molten sheet glass to be worked and the position of the focus of the Fresnel lens after formed are set. The reference symbol L indicates the surface of the molten sheet glass. Among the three prism elements 15a, 15b and 15c shown in the drawing, the prism element 15a is assumed to be at the outermost position. The shape of the prism element 15a is first determined by an mathematical calculation using a computer, and then the shapes of the prism elements 15b and 15c are similarly determined in this order. Concerning the prism element 15a, the shape of the aspherical surface 16a is so determined that the volume of a portion A1 where a prism portion defined by the aspherical surface 16a and riser 18a is intersected by the surface L of the molten sheet glass is substantially equal to the sum of the volume of a region A2 defined by the surface L, virtual cylindrical surface M and aspherical surface 16a and that of a region A3 defined by the surface L, virtual cylindrical surface N and riser 18a. Similarly, the shape of the aspherical surface 16b of the prism element 15b is so determined that the volume of a portion B1 where a prism portion defined by the aspherical surface 16b and riser 18b is intersected by the surface L of the molten sheet glass is substantially equal to the sum of the volume of a region B2 defined by the surface L, virtual cylindrical surface N and aspherical surface 16b and that of a region B3 defined by the surface L, virtual cylindrical surface R and riser 18b. Also, concerning the prism element 15c, the shape of the aspherical surface 16c is so determined that the volume of a portion C1 where a prism portion defined by the aspherical surface 16c and riser 18c is intersected by the surface L of the molten sheet glass is substantially equal to the sum of the volume of a region C2 defined by the surface L, virtual cylindrical surface R and aspherical surface 16c and that of a region C3 defined by the surface, virtual cylindrical surface S and riser 18c. In this way, the shapes of the aspherical surfaces 16 of all the prism elements are determined. In such prism elements, the distances P1, P2, P3, P4, ... from the portions where the aspherical surface L and each riser intersect the outer and inner virtual surfaces, respectively, to the bottom of the molten sheet glass are different from one another. When the surface L of the molten sheet glass is pressed with a mold having cavities of which the shapes are derived from inversion of the shapes of the corresponding plural prism elements, the molten glass within the regions A2 and A3, B2 and B3 and C2 and C3 flows evenly into the regions A1, B1 and C1, respectively, to all the corners thereof.

Figure 5A:
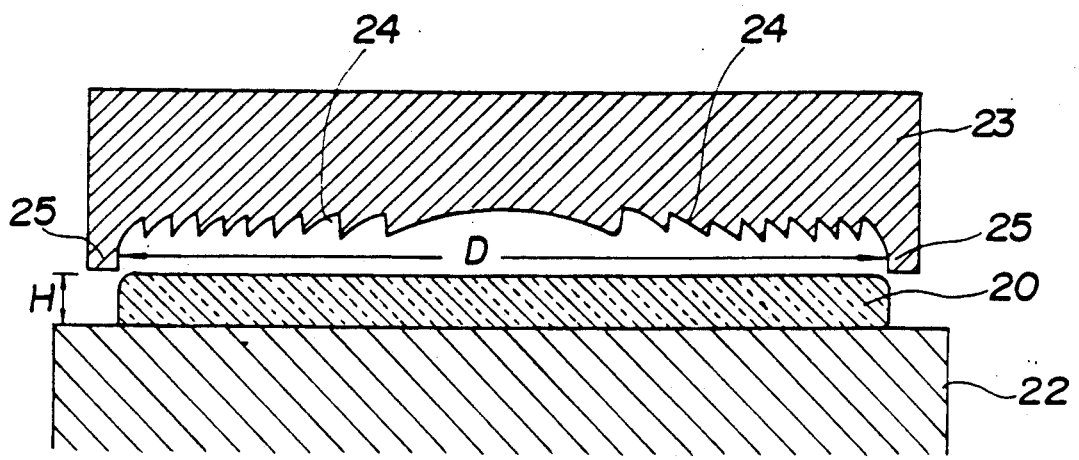
FIGS. 5 (A) to (C) are schematic drawings of the process drawings for explanation of the method according to the present invention.
Figure 5B:
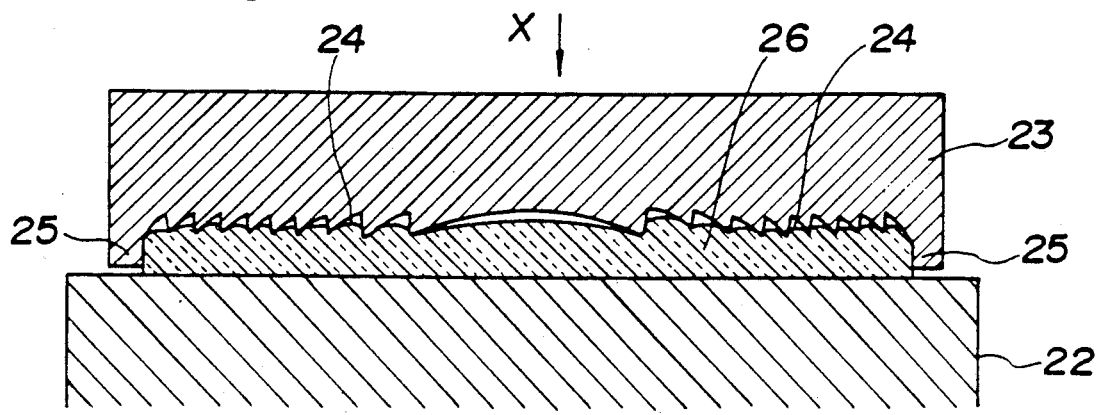
Figure 5C:
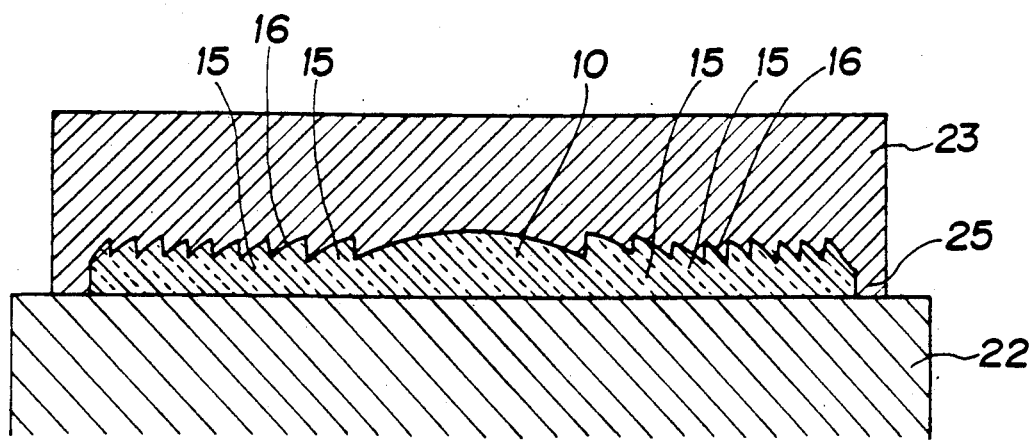

One embodiment of the method for forming Fresnel-type prism lens according to the present invention will be described with reference to FIG. 5. First, a female mold 23 is prepared which have cavities 24 of which the shapes are derived from inversion of the shapes of the corresponding plural prism elements as aforementioned. The female mold 23 has formed along the outer circumference thereof a protrusion 25 which can press a molten sheet glass 20 to a predetermined depth or thickness. Next, the molten sheet glass 20 is previously cut in a known manner into a disk having a predetermined thickness H and a diameter D slightly larger than the diameter of an intended prism lens, and the disk is disposed on the flat surface of a stationary mold 22 as shown in FIG. 5 (A). In this condition, the molten sheet glass 20 is at a temperature between the glass transition point and yield point, the temperature being slightly higher than the glass transition point but rather lower than the yield point. The glass transition point and yield point vary depending upon the kind of the glass used. In this embodiment, a glass is selected of which the glass transition point of 565° C. and yield point of 624° C. At a temperature within such range, the molten sheet glass 20 is plastically fluidable and it shows a high plasticity at a temperature which is nearer to the glass transition point. As the temperature is lower than the glass transition point, the molten sheet glass 20 starts being solidified from the surface. So, the temperature control of the molten sheet glass 20 is very important, and in this embodiment, the temperature of the molten sheet glass 20 is so set as to be lower than the glass transition point only after a series of processes is complete. By the female mold 23 moved downward in the direction of arrow (FIG. 5 (B)) from the step or state shown in FIG. 5 (A), the molten sheet glass 20 is pressed while the molten glass near the surface of the molten sheet glass 20 slowly flows plastically so that the cavities 24 of the female mold 23 corresponding to the prism elements 15 of a prism lens to be formed are charged with the coming molten glass. The female mold 23 is continuously lowered until the protrusion 25 formed along the outer circumference of the female mold 23 reaches the flat surface of the stationary mold 22 (FIG. 5 (C)). Then, the molten glass almost stops flowing. In the phase from the state in FIG. 5 (A) to that in FIG. 5 (C), it is necessary that the molten sheet glass 20 should be maintained at a temperature higher than the glass transition point. The temperature is so controlled as to be lower than the glass transition point after the female mold 23 has fully moved down. The protrusion 25 formed on the female mold 23 also serves to trim the molten sheet glass 20. Therefore, by controlling the temperature of the molten sheet glass 20, it is possible to form many prism lenses from a strip-like molten sheet glass 20 by one pressing.

When the glass is solidified with its temperature being below the glass transition point after the series of processes (A) to (C) as in FIG. 5, namely, after the molten glass stops flowing, the female mold 23 is raised and the prism lens thus formed is removed.

In the method for forming Fresnel-type prism lens according to the present invention, the molten sheet glass 20 when pressed is at a lower temperature than the pressing temperature of gob-like molten glass in the conventional gob pressing. That is, in the conventional gob pressing, the pressing must be done at a temperature near the yield point, namely, at a temperature at which the plasticity of the gob-like molten glass is relatively low. However, it will be obvious to those skill in the art that in the method for forming Fresnel-type prism lens according to the present invention, the molten sheet glass can be pressed at a temperature more approximate to the glass transition point, whereby the plastic flow of the molten glass near the surface of the molten sheet glass can be minimized. Thus, the surface defects such as wrinkle Fresnel-type prism lens formed by the method according to the present invention incurs can be considerably minimized.

Further, since the Fresnel-type prism lens is formed by pressing with a female mold 23 a molten sheet glass 20 disposed on the flat surface of a stationary mold 22, the back surface of the Fresnel-type prism lens thus formed is formed substantially flat. In the method according to the present invention, the back surface may be formed as a spherical surface of a radius being more than about 200 mm can be formed, that is, the substantially flat surface includes such spherical surface.

Figure 6:
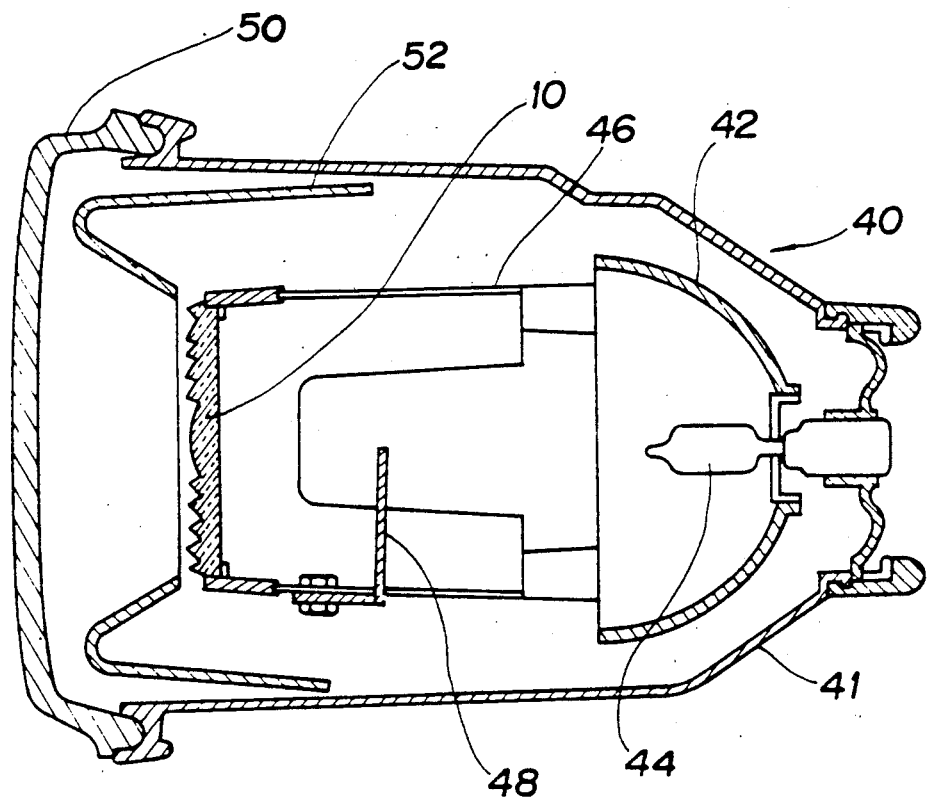
FIG. 6 is a schematic sectional view of a projector-type head light assembly, showing an embodiment in which the Fresnel-type prism lens formed by the method according to the present invention is applied for a projector lens of an automotive projector-type head light assembly.
Figure 7:
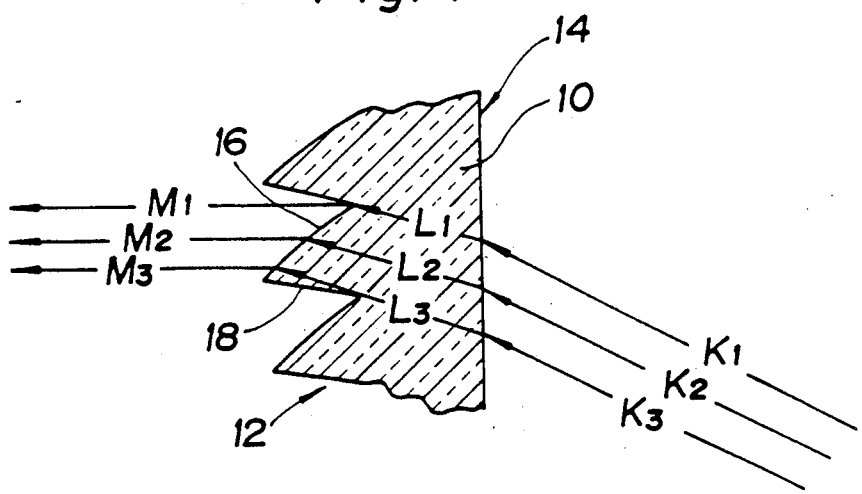
FIG. 7 is an explanatory drawing showing the function of the Fresnel-type prism lens shown in FIG. 6.

FIGS. 6 and 7 show an example application of a Fresnel-type prism lens produced by the method according to the present invention to a projector lens in an automotive projector type head light assembly. The projector-type head lamp assembly is indicated as a while with a reference numeral 40. The head light assembly 40 has a lamp housing 41 in which a reflector 42 is disposed. The reflector 42 is formed as a part of, for example, a spheroid. The reflector 42 has a lamp bulb 44 disposed at one of the foci thereof and a shade 48 near the other focus thereof. There is disposed outside the shade 48 a Fresnel lens 10 having the focus on the cut line of the shade 48. Also there is provided on the opening of the lamp housing 41 a transparent cover 50 in front of the Fresnel lens 10. An inner panel 52 is disposed between the Fresnel lens 10 and cover 50 to prevent an excess of the light projected frontward through the Fresnel lens 10 from going out of the head light assembly 40. No lens is physically formed on the transparent cover 50, but an appropriate lens element may be formed there to obtain a desired light distribution. In this projector-type head light assembly, the Fresnel lens 10 is disposed with the prism surface as directed frontward so that the light incident upon the back surface 14 of the Fresnel lens 10 is effectively refracted and projected frontward from the front surface 12. As shown in FIG. 7, the light beams indicated with K1, K2 and K3 are emitted from the light source 44, condensed in the proximity of the shade 48 as reflected by the reflective surface of the reflector 42, shaped into a predetermined form by the cut line of the shade 42, and is incident upon the back surface 14 of the Fresnel lens 10. They are further refracted by the flat surface as shown with the light beams L1, L2 and L3, respectively, refracted by the aspherical surface 16 in directions nearly parallel to the optical axis, and then projected frontward of the lens as shown with M1, M2 and M3, respectively.

As having been described in the foregoing, the Fresnel lens 10 disposed with the prism surfaces directed frontward is so configured that the light beams incident upon the back surface 14 are substantially totally incident upon the aspherical surfaces of the prism elements while few light beams are incident upon the risers 18, and thus permits to more effectively utilize the light beams than with such Fresnel lens disposed with the prism surfaces directed toward the light source. Furthermore, the Fresnel lens formed by the method according to the present invention is lightweight and inexpensive as compared with the conventional single concave lens made from glass, and in case it is used as mentioned above, the Fresnel lens will neither be stained nor scratched on the prism surfaces thereof owing to the transparent cover 50 provided outside the lens.

What is claimed is:

1. A method for forming from a molten sheet glass a Fresnel lens including a body having a front surface and back surface, the frontal surface being formed with a plurality of annular Fresnel-type prism elements concentrically disposed and the back surface being formed substantially flat, comprising the sequential steps of:
   (a) cutting said molten sheet glass into a disk having a substantially constant predetermined thickness;
   (b) disposing said disk on a stationary mold having a substantially flat surface;
   (c) pressing said disk with a moving female mold having a plurality of alternating cavities and protrusions corresponding to said prism elements so that the amount of said molten sheet glass displaced by each protrusion flows substantially only into the two cavities adjacent to said protrusion;
   (d) solidifying the resultant pressed disk; and
   (e) withdrawing said female mold,
   wherein said prism elements comprise a first prism portion defined by an aspherical surface which refracts a light beam outgoing from the focus in a direction substantially parallel to he optical axis and a riser, and a second prism portion defined by first and second virtual cylindrical surfaces perpendicular to said back surface and spaced from each other a pitch between said prism elements, and said back surface;
   wherein the volume of a portion of each prism element at which said first prism portion is intersected by a virtual plane representing the surface of said disk prior to pressing is substantially equal to the sum of the volume of a region of a first protrusion defined by said first virtual cylindrical surface, said virtual plane and said aspherical surface and that of a region of a second protrusion defined by said second virtual cylindrical surface, said virtual plane and said riser.

2. A method according to claim 1, wherein the temperature of said molten sheet glass during steps (b) and (c) is higher than the glass transition point and lower than the yield point.

3. A method according to claim 2, wherein the temperature of said molten sheet glass during steps (b) and (c) is closer to the glass transition point than to the yield point.

* * * * *